United States Patent [19]

Bielinski et al.

[11] Patent Number: 4,538,199
[45] Date of Patent: Aug. 27, 1985

[54] ELECTROTHERMAL WIRE RESPONSIVE MINIATURE PRECISION CURRENT SENSOR

[75] Inventors: Ralph F. Bielinski, So. Milwaukee, Wis.; M. Frank Chacon, Athens, Ala.; Dennis M. Kramer, Brookfield; William R. Mathias, Cedarburg, both of Wis.; Stanley Schneider, Broomall, Pa.

[73] Assignee: Eaton Corporation, Cleveland, Ohio

[21] Appl. No.: 513,570

[22] Filed: Jul. 14, 1983

[51] Int. Cl.³ .............................................. H02H 5/04
[52] U.S. Cl. .................................... 361/93; 361/103; 324/105
[58] Field of Search .................... 361/93, 99, 103, 104, 361/106; 324/95, 96, 105, 106; 307/310; 374/178

[56] References Cited

U.S. PATENT DOCUMENTS 3,696,294 10/1972 Krupka ................................. 324/105
3,794,950 2/1974 Kilner ............................. 361/106 X
4,004,462 1/1977 Dobkin ........................... 307/310 X

FOREIGN PATENT DOCUMENTS 2117639 10/1972 Fed. Rep. of Germany ...... 361/106
1140522 1/1969 United Kingdom ................ 324/106

Primary Examiner—Harry E. Moose, Jr.
Attorney, Agent, or Firm—C. H. Grace; Wm. A. Autio

[57] ABSTRACT

A resistance wire sensing overcurrent protection module (CSM) for an electrical supply circuit (SC) having a hot temperature sensing diode (32) mounted at the center portion (8c) of an M-shaped resistance wire (8) connected in the supply circuit and an ambient temperature sensing diode (20) mounted on a substrate (18) supported between the supply terminals (4a-b, 6a-b), both diodes being connected to respective pairs of terminals (12a-b, 10a-b) mounted on a header (18) along with the supply terminals. A cover (46) is mounted on the header and filled with glass micro-balloons (48) to isolate thermally the two diodes. A constant current circuit (49) supplies constant current to the two diodes which operate a differential amplifier (52) having an output proportional to the temperature difference as a measure of supply current. This output trips a Schmitt trigger comparator (54) when the supply current rises to an overload value.

14 Claims, 4 Drawing Figures

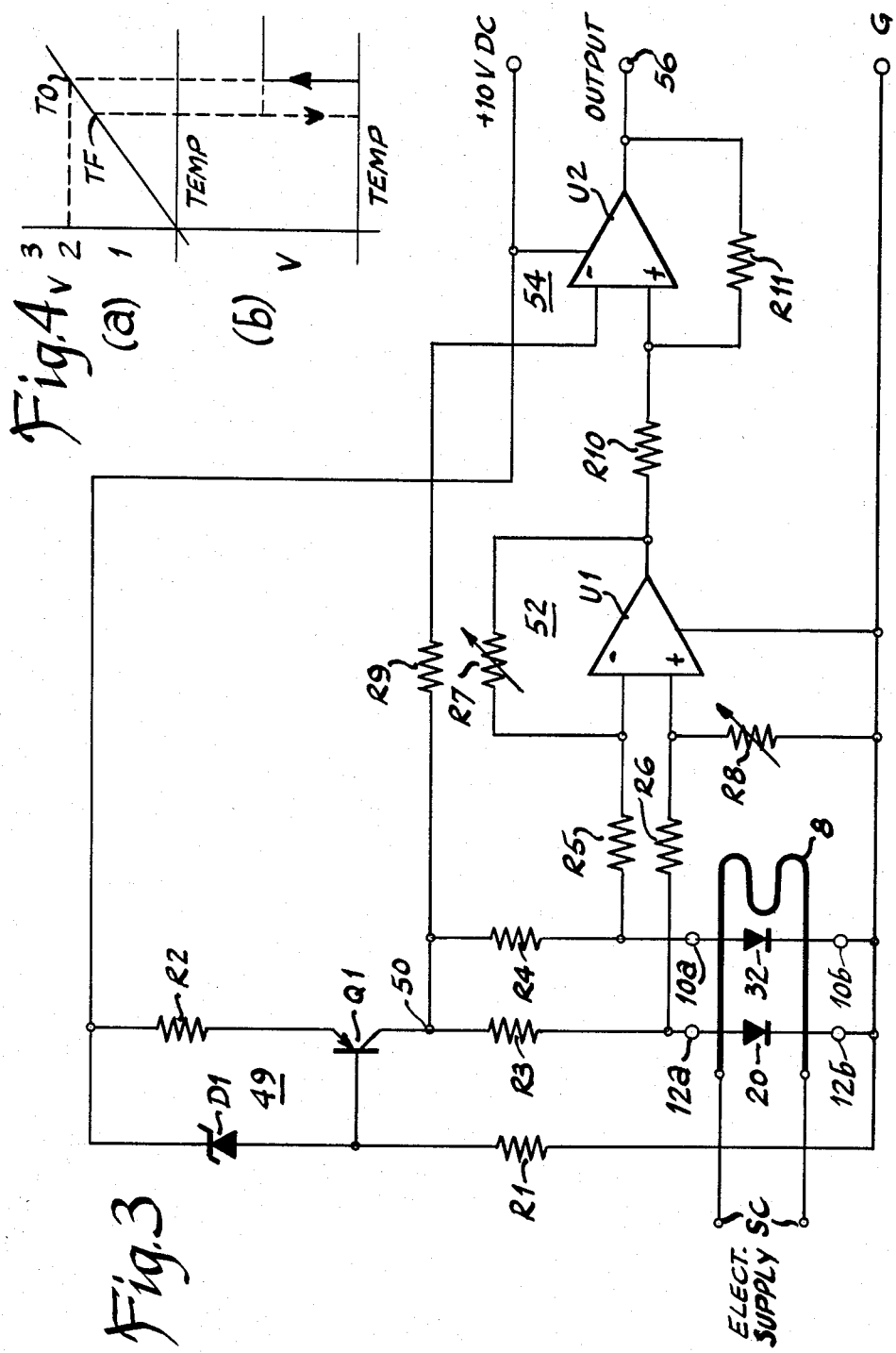

ELECTROTHERMAL WIRE RESPONSIVE MINIATURE PRECISION CURRENT SENSOR

BACKGROUND OF THE INVENTION

Current sensors for overload trip and other purposes have been known heretofore. For example, circuit breakers and fuses have been used to monitor the current in an electrical circuit and to protect the circuit from a current overload. The means that these devices have used to sense the actual current flow have been magnetic, thermal (such as bimetal, fuses, etc.) and electronic. Whatever the means that have been used, the circuit current has been sensed and an appropriate signal has been provided when an overload occurs. In the case of circuit breakers, what has been primarily used has been magnetic sensing and/or thermal current sensing, the thermal current sensing being accomplished primarily with bimetal or heated wire expansion techniques. In the case of fuses, the heated one-time link has been the method for monitoring and controlling current overloads. However, detecting and replacing a "blown" fuse presents an undesirable maintenance problem.

While these prior current sensing devices have been useful for their intended purposes, they have been handicapped in a variety of ways. For example, disadvantages of such prior current sensing devices include lack of sensitivity due to the requirement for a mechanical output, this being a particular problem for low current devices. Also, such prior devices have had wide tolerance envelopes, susceptibility to environmental effects, long term stability problems due to wear and drift, compatibility problems with electronic control circuits, manufacturing and calibration problems, response characteristics fixed by their mechanical configurations which made them difficult to modify for particular needs, coordination problems, and time delay difficulties of the magnetic devices. Potential difficulties with various electronic current sensing devices included input isolation and protection, power supply requirement, desired response under all conditions, indirect drive to open contacts, ultimate fusibility, reliability at extreme temperatures (beyond design limits), cost, unpredictable factors with respect to new technology, and radiation hardness.

SUMMARY OF THE INVENTION

An object of the invention is to provide an improved electrothermal wire responsive miniature precision current sensor.

A more specific object of the invention is to provide an improved current sensor having much greater sensitivity, resulting in less sensor power dissipation and lower forward voltage drop for low current devices.

Another specific object of the invention is to provide an improved current sensor affording more suitable interfacing to electronic control circuits.

Another specific object of the invention is to provide an improved current sensor having better accuracy and repeatability since it involves no friction.

Another specific object of the invention is to provide an improved current sensor that is less susceptible to environmental effects.

Another specific object of the invention is to provide an improved current sensor that has long term stability since there is nothing to wear out.

Another specific object of the invention is to provide an improved current sensor that makes various trip-time and cool-down responses possible.

Another specific object of the invention is to provide an improved electronic current sensor that has greater versatility in that one such electronic sensor could be used over a wide current range.

Another specific object of the invention is to provide an improved current sensor that is easier to manufacture and adjust.

Another specific object of the invention is to provide an improved current sensor that can be packaged in a small volume.

Another specific object of the invention is to provide an improved current sensor that makes coordination easier due to its response characteristics.

Another specific object of the invention is to provide an improved electrothermal current sensor of the aforementioned type that affords electrical isolation of the sensing circuit from the electrical supply line.

Another specific object of the invention is to provide an electrothermal wire current sensor of the aforementioned type wherein the resistance wire has a built-in delay to spurious transients that might occur on the supply line due to the response time of the heating of the wire, that is, a natural integrator.

Another specific object of the invention is to provide an electrothermal wire current sensor of the aforementioned type having different means of controlling current ranges such as wire diameter, wire length and/or differential amplifier circuit gain.

Another specific object of the invention is to provide an electrothermal wire current sensor where the heated wire itself can provide a back-up fuse link function in case of a catastrophic fault.

Another specific object of the invention is to provide an electrothermal wire current sensor of the aforementioned type wherein the sensor element is equally applicable to measuring RMS alternating current or DC current.

Other objects and advantages of the invention will hereinafter appear.

BRIEF DESCRIPTION OF THE DRAWINGS

FIG. 3 is a schematic circuit diagram of the electronic portion of the current sensor to which the diodes of FIG. 1 are connected.

FIG. 4 is a graph showing operating characteristics of the circuit of FIG. 3.

DESCRIPTION OF THE PREFERRED EMBODIMENT

Figure 1:
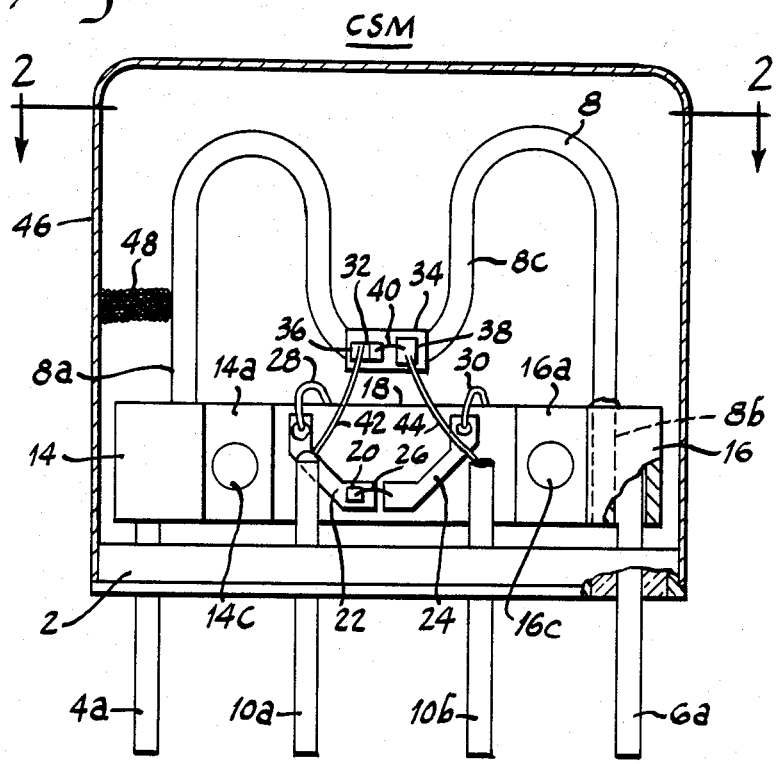
FIG. 1 is a cross sectional view taken substantially along line 1—1 of FIG. 2 of the electrothermal wire and heat sensing diodes assembly or module constructed in accordance with the invention.
Figure 2:
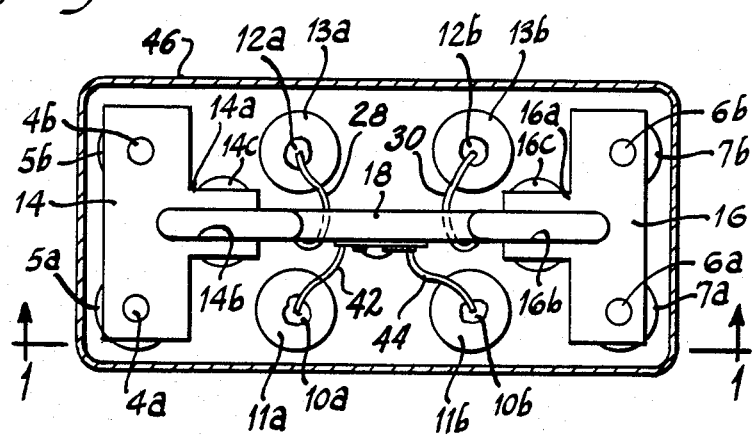
FIG. 2 is a cross sectional view taken substantially along line 2—2 of the assembly of FIG. 1.

Referring to FIGS. 1-2 there is shown a current sense module CSM constructed in accordance with the invention. As shown therein, this module comprises a header 2 of cold rolled steel or the like serving as a support for two pairs of connecting and supporting terminals 4a–b and 6a–b for a resistance wire current conducting element 8 and also serving as a support for two pairs of diode connecting terminals 10a–b and 12a–b. As shown in FIGS. 1 and 2, all of the terminals are supported and sealed in header 2 by means of glass seals or the like, terminals 4a-b having glass seals 5a-b, terminals 6a-b having glass seals 7a-b, terminals 10a-b having glass seals 11a-b and terminals 12a-b having glass seals 13a-b. These glass seals serve not only to support the terminals in the header but also to electrically insulate them from the header and the glass has the same coefficient of expansion as the terminals.

Resistance wire element 8 is supported on supply line pairs of terminals 4a-b and 6a-b by means of a pair of T-shaped electrically conducting supports 14 and 16. As shown in FIGS. 1 and 2, support 14 has a pair of spaced apart holes into which terminals 4a and 4b extend and are preferably brazed therein. In a similar manner, support 16 has a pair of spaced apart holes into which terminals 6a and 6b extend and are preferably brazed therein. The stem portion 14a of support 14 is provided with a central slot 14b for supporting one end of a generally rectangular planar substrate 18 of beryllium oxide or the like. In a similar manner, the stem portion 16a of support 16 is provided with a central slot 16b for supporting the other end of substrate 18. To rigidly secure substrate 18 to supports 14 and 16, rivets 14c and 16c extend through stem portions 14a and 16a, respectively, of the supports 14 and 16 and also through the opposite end portions of substrate 18. As will be apparent, the purpose of substrate 18 is to support an ambient temperature sensing diode 20 so that the temperature of resistance wire 8 can be compared to ambient temperature. For this purpose, a pair of conductors 22 and 24 are mounted on substrate 18 and diode 20 is mounted on and electrically connected to conductor 22 at one side thereof while the other side thereof is connected by a short wire 26 to conductor 24. Substrate conductors 22 and 24 are then connected by a pair of wires 28 and 30, respectively, to terminals 12a and 12b as shown in FIGS. 1-2.

In order to sense the temperature of resistance wire current conducting element 8, another like heat sensing diode 32 is mounted thereon. For this purpose, a mounting tab 34 of beryllium oxide or the like is secured as by brazing to the center point of resistance wire element 8 and diode 32 is mounted on tab 34 as shown in FIG. 1. A pair of connectors 36 and 38 are mounted on tab 34. Diode 32 is mounted at one side on connector 36 and is connected by a wire 40 at its other side to connector 38. And connectors 36 and 38 on tab 34 are connected by wires 42 and 44 to the upper ends of terminals 10a and 10b.

As shown in FIG. 1, resistance wire 8 is provided with a generally M-shaped configuration and the downwardly projecting legs 8a and 8b thereof extend into vertical holes in support members 14 and 16 and are secured therein preferably by brazing. The M-shaped configuration of the resistance wire reduces the thermal displacement of the centerpoint wherein "hot" diode 32 is mounted and also allows the "hot" diode connections to be made in the vicinity of or adjacent to the connections of the "reference" diode connections, that is, at terminals 10a-b which extend through the header adjacent to terminals 12a-b. Element 8 is preferably a nickel-chromium-iron resistance wire generally known as Nichrome wire which has good heat and oxidation resistant characteristics. Substrate 18 and tab 34 are made of beryllium oxide or the like which has good thermal conductivity and poor electrical conductivity.

The housing for this current sense module includes not only header 2 but also a cover 46 which may be made of any suitable material such as stainless steel or the like and encloses the resistance wire element and the diodes and associated structure and is attached at its rim to the periphery of the header. The interior of this cover is filled with glass micro-balloons 48 or the like as insulating material to isolate resistance wire element 8 and hot diode 32 from ambient diode 20, while causing both diodes to vary equally in response to ambient temperature changes, so that the differential temperature therebetween can be detected and used when it reaches a predetermined value for overload tripping purposes. The resistance wire acts as a back-up current limiting, fusible line whereby if currents well in excess of sensing range, in magnitude and/or duration, exist, fusing of the nichrome wire causes the current to interrupt. The glass micro-balloons, having a lower melting temperature than the resistance wire element 8, melt around the fused pieces of the resistance wire and safely encapsulate and insulate the discontinuous pieces of the resistance wire such that the circuit interruption is made permanent.

Diodes 20 and 32 are silicon signal diodes of the 1N914 type or the like which are very high speed switching diodes having high conductance, fast recovery time, low leakage and low capacitance combined with improved uniformity and reliability. Also, these diodes have a substantially linear reverse current versus temperature characteristic and are of the negative temperature coefficient (NTC) type. Consequently, as the temperature of the hot diode increases with increasing current flow through the resistance wire element, the resistance of the diode decreases in accordance with the aforementioned characteristic. These diodes are used herein because thermistors are too slow and thermocouples require too much circuitry as, for example, for cold junction compensation. Also, thermistors would be too large and would not have the temperature range necessary for this particular application.

It will be apparent that by use of a resistance wire in the supply line and differential temperature sensing diodes, this module can be used equally well for sensing either DC or RMS alternating current. Also, a resistance wire of the aforementioned Nichrome type or the like has the required temperature range usable with the other components. Also, such resistance wire functions as a natural integrator in that it absorbs any transient current peaks occurring in the supply line.

Both diodes 20 and 32 are enclosed within the housing and are closely surrounded by micro-balloons 48 so that ambient temperature changes will not affect one of them differently from the other. For example, if the ambient temperature sensing diode were placed outside the housing, a rapid drop in ambient temperature would increase the differential to a point that would cause a false overload trip. Inside the housing, both diodes are affected the same by a rapid change in ambient temperature so that the differential does not change. The diodes are mounted and associated so that both are affected to the same degree by ambient temperature variation. Consequently, it will be apparent that while diode 20 has been shown mounted on substrate 18, this substrate could be eliminated and the ambient sensing diode mounted otherwise within the housing. Also, while conducting supports 14 and 16 are shown as T-shaped, they could have other shapes such as rectangular or could be eliminated entirely along with terminal pairs 4a-b and 6a-b and the ends of sensor element 8 extended through the substrate to serve as electrical terminals. Other modifications will be apparent to provide a sensor module of minimum overall size.

Referring to FIG. 3, there is shown a current sense amplifier for providing an output trip signal in response to sensing a predetermined differential temperature between the center point, which is the hottest point, of resistance wire element 8 and the ambient temperature occurring in substrate 18. As shown in FIG. 3, this circuit is supplied from a positive 10 volt DC source to ground G. There is provided at the upper left-hand portion of FIG. 3 a constant current circuit 49 comprising transistor Q1, resistors R1 and R2 and a zener diode D1. This zener diode D1 has a voltage rating of less than 10 volts so that a current flows therethrough and through resistor R1 to ground, causing zener diode D1 to apply a constant emitter to base voltage bias to transistor Q1, whereby transistor Q1 conducts a constant current through resistor R2 to junction 50 and then in parallel paths through resistors R3 and R4 and cold and hot diodes 20 and 32, respectively, to ground G. Since silicon signal diodes 20 and 32 have negative temperature coefficient of resistance characteristics, as the temperature of hot diode 32 increases while the temperature of cold diode 20 increases at a slower rate, the voltage at the anode of diode 32 will decrease while the voltage at the anode of diode 20 will decrease at a slower rate. For this purpose, the sensor module measures the differential between the temperature of the resistance wire element and the ambient temperature within the module which also varies with the variation of current through the resistance wire. That differential temperature is what is used to represent a given current magnitude in the load circuit.

This variation in the voltage between the anodes of diodes 20 and 32 is applied through a differential amplifier 52 to obtain a control voltage that increases in proportion to the increase in the current in the supply line and this control voltage is then applied to a comparator 54 which switches when the current in the supply line reaches an overload value to provide an output trip signal.

Differential amplifier 52 comprises a pair of resistors R5 and R6 connected from the anodes of diodes 20 and 32 to the inverting and non-inverting inputs, respectively, of operational amplifier U1. An adjustable resistor R7 is connected between the output and the inverting input of amplifier U1 while the non-inverting input of amplifier U1 is connected through an adjustable resistor R8 to ground.

Comparator 54 of the Schmitt trigger type or the like comprises a resistor R9 connected to apply a constant reference voltage from junction 50 to the inverting input of operational amplifier U2 while a resistor R10 is connected from the output of differential amplifier 52 to the non-inverting input of amplifier U2. A resistor R11 is connected from the output of amplifier U2 to the non-inverting input thereof. The output of comparator 54 is connected to output terminal 56. Alternatively, the output of differential amplifier U1 could be the output terminal, which provides an analog output proportional to current flow.

Terminals 4a–b and 6a–b of the module in FIGS. 1 and 2 are connected in the supply circuit SC to be protected, so that the supply current flows through resistance wire 8. Terminals 10a–b and 12a–b of the module in FIGS. 1 and 2 are connected to the circuit in FIG. 3 as shown therein so as to connect hot diode 32 and cold diode 32 between junction 50 and ground. In FIG. 3, a constant current flows from the 10 volt source through transistor Q1 to junction 50 and then in parallel paths through ambient diode 20 and hot diode 32 to ground. As the current in the supply circuit increases, the temperature of resistance wire element 8 rises and is sensed by diode 32 while the temperature of diode 20 rises at a slower rate, the ambient affecting both diodes equally. Since diode 32 is a negative temperature coefficient of resistance type, this causes the voltage at its anode to decrease in proportion to the increase in supply current and this voltage decrease appears at the inverting input of amplifier U1. This causes the voltage at the output of differential amplifier 52 to rise as shown by the graph in FIG. 4(a). A predetermined reference voltage of constant value is applied from junction 50 through resistor R9 to the inverting input of amplifier U2 in comparator 54. As the output voltage of differential amplifier 52 increases as shown in FIG. 4(a), this voltage is applied through resistor R10 to the non-inverting input of comparator 54. When this differential amplifier output voltage reaches a predetermined turn-on value TO indicative of an overload condition in the supply circuit, which value is shown by broken lines in FIG. 4(a), it causes the output of comparator 54 to switch in a positive-going manner as shown by the solid line graph in FIG. 4(b). This positive voltage is applied to output terminal 56 and may be used therefrom to operate a contactor or the like to protect the supply circuit. Resistors R7 and R8 in differential amplifier 52 are shown as being adjustable to be able to adjust the gain of the amplifier and thereby select the overload current value at which comparator 54 switches. Resistor R11 in the comparator provides hysteresis so that when the output of the differential amplifier decreases as shown in FIG. 4(a), it must decrease a certain amount below the turn-on value TO of the comparator to a turn-off value TF shown in FIG. 4(a) before the comparator switches off as shown by the broken line in FIG. 4(b).

An additional advantage of this current sensor is that it can be operated over a wide range of ambient temperatures, such as for example between minus 55° C. to plus 125° C. For a constant current applied to the resistance wire, it will trip out at substantially the same differential voltage even when the ambient temperature at which it is operating varies widely. Thus, the current sensor will accurately and repeatedly function within the overload current trip window normally required for devices of this type. Also, the same circuit shown in FIG. 3 can be used for a wide range of low amperage supply currents such as, for example, from 1 amp to about 10 amps.

While the apparatus hereinbefore described is effectively adapted to fulfill the objects stated, it is to be understood that the invention is not intended to be confined to the particular preferred embodiment of electrothermal wire responsive miniature precision current sensor disclosed, inasmuch as it is susceptible of various modifications without departing from the scope of the appended claims.

We claim:

1. An overcurrent protection system for an electrical supply circuit comprising:
    a fast response current sensor comprising:
    electrothermal menas for generating heat as a function of the value of current in said supply circuit;
    means comprising a first PN junction semiconductor sensor device for sensing ambient temperature and providing a first control signal in proportion thereto;

means comprising a second PN junction semiconductor sensor device for sensing the temperature of said heat generating electrothermal means and providing a second control signal in proportion thereto;

and differential means responsive to said first and second control signals, including means for adjusting the same for a predetermined output value at ambient temperature, for providing an electrical operating signal proportional to the differential of said first and second control signals indicative of the current in said supply circuit.

2. The overcurrent protection system claimed in claim 1, wherein said system comprises:

current-proportional-signal threshold means responsive to said electrical operating signal rising to or above a critical value indicative of an overcurrent condition in said supply circuit for providing an output trip signal for operating a protective device.

3. The overcurrent protection system claimed in claim 1, wherein:

said electrothermal means comprises a resistance wire element connected in said electrical supply circuit for heating in response to current flow therethrough.

4. The overcurrent protection system claimed in claim 3, wherein said means comprising a second PN junction semiconductor sensor device comprises:

means mounting said second sensor device at the midpoint of said resistance wire element for sensing the temperature thereof as a measure of the value of current flow therethroug.

5. The overcurrent protection system claimed in claim 4, wherein:

said electrothermal means comprises a nickel-chromium-iron resistance wire element connected in said electrical supply circuit for heating in proportion to current flow therethrough and having means for reducing the thermal displacemment of its centerpoint where said heat sensitive device is mounted.

6. The overcurrent protection system claimed in claim 5, wherein:

said nickel-chromium-iron resistance wire element provides a back-up current limiting fusible link function in the event currents well in excess of the sensing range in magnitude and duration occur in said power supply line and fusing of said wire sensor element causing the current to be interrupted;

and said resistance wire element is closely surrounded by insulating micro-balloons to isolate said heat sensor device and said resistance wire element from ambient temperature;

and said micro-balloons having a lower melting temperature than said wire element and consequently melt around the fused pieces of said wire element and safely incapsulate and insulate the discontinuous pieces of said wire element such that the circuit interruption is made permanent.

7. The overcurrent protection system claimed in claim 1, wherein said means comprising a first PN junction semiconductor sensor device comprises:

a substrate;

and a heat sensitive electro-responsive solid state element mounted on said substrate for sensing ambient temperature.

8. The overcurrent protection system claimed in claim 1, wherein said means comprising a second PN junction semiconductor sensor device comprises:

a substrate secured to said electrothermal means;

and means mounting said second PN junction semiconductor sensor device on said substrate for sensing the temperature of said electrothermal means.

9. An overcurrent protection system for an electrical supply circuit comprising:

a housing comprising a base and a cover;

a first pair of electrical terminals mounted on said base;

an electrical resistance wire element;

means connecting and supporting said resistance wire element on said terminals within said housing so as to conduct the supply current of an electrical supply connected to said first pair of terminals;

a substrate mounted on said connecting and supporting means;

an ambient temperature sensing diode mounted on said substrate;

a hot temperature sensing diode mounted to said resistance wire element for sensing the temperature thereof proportional to the current flowing therein;

second and third pairs of terminals mounted on said base and means connecting said diodes respectively thereto;

an electronic circuit connected to said second and third pairs of terminals for providing a differential signal proportional to the temperature of said resistance wire element above ambient temperature;

and means responsive to said differential signal when said supply current rises to the overload value for providing a trip signal.

10. The overcurrent protection system claimed in claim 9, wherein:

said resistance wire element extends upwardly from said first pair of terminals and has a downwardly hanging loop at its midportion to which said hot temperature sensing diode is mounted so as to reduce the thermal displacement of said resistance wire element at the point where said hot temperature sensing diode is mounted and to facilitate connecting said hot diode to its terminals.

11. The overcurrent protection system claimed in claim 9, wherein:

said housing encloses heat insulating material between said diodes so as to isolate said hot temperature sensing diode from said ambient temperature sensing diode.

12. An electrothermal current sensor for low amperage overload trip service comprising:

a resistance wire sensor element connected in a low amperage electric power supply line for heating in proportion to electric current flow therethrough;

said resistance wire sensor element being composed of an alloy having a response time for heating that provides a built-in delay to spurious transients that might occur on the power supply line;

said wire sensor element being operable to control the current ranges within which said wire effectively produces heat in proportion to given currents therein by varying the wire diameter or the wire length;

said wire sensor element being equally effective for heating in proportion to D.C. current or RMS A.C. current;

said wire sensor element providing a back-up current limiting fusible link function in the event currents well in excess of the sensing range in magnitude and duration occur in said power supply line and fusing of said wire sensor element causing the current to be interrupted;

a housing comprising a header;

said resistance wire sensor element connected at its ends to a pair of terminals mounted on said header and being substantially M-shaped;

a substrate mounted between said terminals within said housing;

an ambient temperature sensing solid state diode mounted on said substrate;

a heat sensing solid state diode mounted at substantially the midpoint of said resistance wire sensor element;

and said ambient temperature diode and said heat sensing diode being connected to pairs of terminals supported on said header.

13. The electrothermal current sensor claimed in claim 12, wherein:

said housing is filled with glass micro-balloons to isolate said heat sensing diode and said resistance wire element from ambient temperature.

14. The electrothermal current sensor claimed in claim 13, wherein:

said resistance wire sensor element is a nickel-chromium-iron wire;

and said glass micro-balloons having a lower melting temperature than said wire and consequently melt around the fused pieces of said wire and safely encapsulate and insulate the discontinuous pieces of said wire element such that the circuit interruption is made permanent.

* * * * *